US008122147B2

(12) United States Patent
Driscoll et al.

(10) Patent No.: US 8,122,147 B2
(45) Date of Patent: Feb. 21, 2012

(54) METHOD FOR ACKNOWLEDGEMENT OF MESSAGES IN A STAR NETWORK

(75) Inventors: Kevin R. Driscoll, Maple Grove, MN (US); Brendan Hall, Eden Prairie, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 1195 days.

(21) Appl. No.: 11/557,886

(22) Filed: Nov. 8, 2006

(65) Prior Publication Data

US 2008/0107024 A1     May 8, 2008

(51) Int. Cl.
G06F 15/16     (2006.01)
(52) U.S. Cl. ........ 709/237; 709/238; 709/246; 709/203; 370/400; 370/406
(58) Field of Classification Search ................... 709/237, 709/238, 246; 370/400, 406, 235
See application file for complete search history.

(56) References Cited

U.S. PATENT DOCUMENTS

| 5,542,047 | A  | * | 7/1996  | Armstrong    | 709/224 |
|-----------|----|---|---------|--------------|---------|
| 6,170,003 | B1 | * | 1/2001  | Benkual et al.| 709/214 |
| 6,219,353 | B1 | * | 4/2001  | Wight et al. | 370/425 |
| 6,711,411 | B1 |   | 3/2004  | Ruffini      |         |
| 6,822,970 | B1 | * | 11/2004 | Redd et al.  | 370/446 |
| 7,535,915 | B2 | * | 5/2009  | Collins      | 370/410 |
| 2004/0078428 | A1 | * | 4/2004 | Cherry       | 709/203 |
| 2005/0060202 | A1 |   | 3/2005 | Taylor et al.|         |
| 2005/0141524 | A1 | * | 6/2005 | Hall et al.  | 370/400 |
| 2006/0256802 | A1 | * | 11/2006| Edwards      | 370/401 |
| 2007/0076650 | A1 | * | 4/2007 | Manjeshwar et al. | 370/328 |
| 2007/0097859 | A1 | * | 5/2007 | Tancevski et al. | 370/228 |
| 2007/0274309 | A1 | * | 11/2007| Donaghey     | 370/389 |
| 2008/0170580 | A1 | * | 7/2008 | Goldman et al.| 370/406 |
| 2009/0129383 | A1 | * | 5/2009 | Maalouf et al.| 370/390 |

FOREIGN PATENT DOCUMENTS

EP     0510822     10/1992

OTHER PUBLICATIONS

European Patent Office, "European Search Report", Jun. 13, 2008, Published in: EP.
Yu et al., "A Graph-Based Proactive Fault Identification Approach in Computer Networks", "Computer Communications", Mar. 16, 2005, pp. 366-378, vol. 28, No. 4, Publisher: Eslevier Science Publishers BV, Published in: Amsterdam, NL.

* cited by examiner

*Primary Examiner* — Joe Cheng
*Assistant Examiner* — Khaled Kassim
(74) *Attorney, Agent, or Firm* — Fogg & Powers LLC

(57) ABSTRACT

A method of communicating node status in a star network comprising a hub and a plurality of nodes comprises sending a first message to the hub from a first node included in the plurality of nodes; forwarding the first message from the hub to at least one second node included in the plurality of nodes; communicating status information to the hub from the at least one second node after receiving at least a portion of the first message at the at least one second node; compiling a status vector based on the status information received from each of the at least one second nodes; and sending the status vector from the hub to at least the first node.

18 Claims, 1 Drawing Sheet

METHOD FOR ACKNOWLEDGEMENT OF MESSAGES IN A STAR NETWORK

BACKGROUND

Acknowledgement of messages in communication systems can be used for and to simplify higher-level layers. Typically, acknowledgement is sent from the receiver back to the sender. In embedded communication systems where communication is often multicast (multiple receivers) and the reception status of messages is often a system-wide status that—if known—can be used on the application e.g. to manage redundancy sets or to built a system-wide operational status of the participants in communication (where the reception of a non-faulty message is equivalent to the operation status of a node for a dependable communication where message send or message receive failures get mapped to node failures).

SUMMARY

In one embodiment, a method of communicating node status in a star network comprising a hub and a plurality of nodes is provided. The method comprises sending a first message to the hub from a first node included in the plurality of nodes; forwarding the first message from the hub to at least one second node included in the plurality of nodes; communicating status information to the hub from the at least one second node after receiving at least a portion of the first message at the at least one second node; compiling a status vector based on the status information received from each of the at least one second nodes; and sending the status vector from the hub to at least the first node.

DRAWINGS

DETAILED DESCRIPTION

Figure 1:
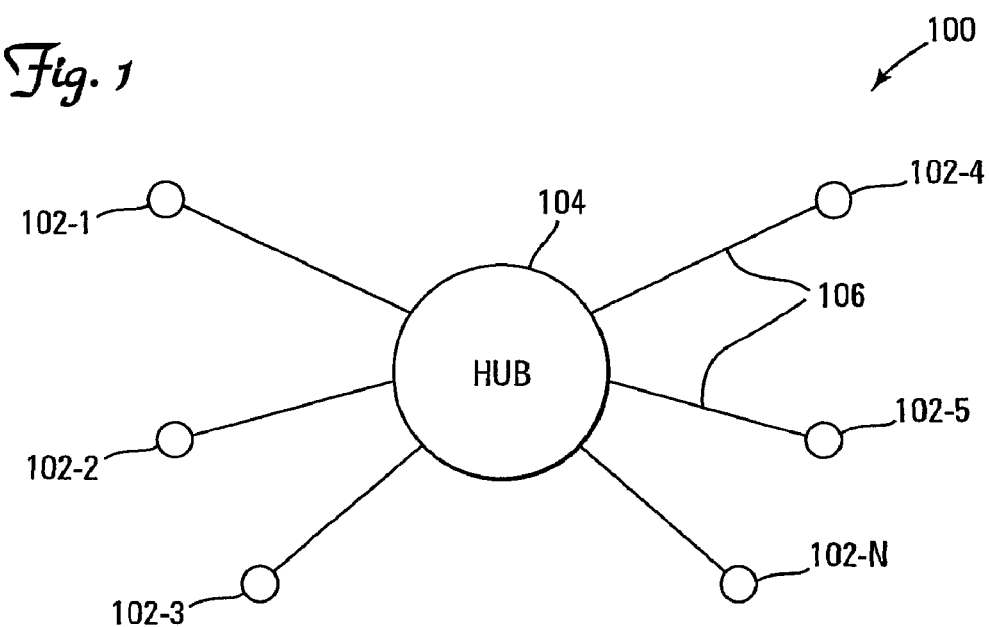
FIG. 1 is a schematic depiction of a star network according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary methods illustrated may include additional or fewer steps or may be performed in the context of a larger processing scheme. Furthermore, the methods presented in the drawing figures or the specification is not to be construed as limiting the order in which the individual steps may be performed. The following detailed description is, therefore, not to be taken in a limiting sense.

Instructions for carrying out the various process tasks, calculations, and generation of signals and other data used in the operation of the systems and methods of the invention can be implemented in software, firmware, or other processor-readable instructions. These instructions are typically stored on any appropriate processor-readable medium used for storage of processor-readable instructions or data structures. Such processor-readable media can be any available media that can be accessed by a general purpose or special purpose processor, or any programmable logic device.

Suitable processor-readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a programmable processor, the processor properly views the connection as a processor-readable medium. Thus, any such connection is properly termed a processor-readable medium. Combinations of the above are also included within the scope of processor-readable media.

It should be noted that the terms "frame," "message" and "packet" can be used interchangeably in the following description. In addition, the term "transmission round" refers to the time period for all of the nodes in the network to complete a transmission. Status information refers to information indicating successful receipt of at least a portion of a message. In addition, status information, in some embodiments, refers to information used in allocating transmission periods (e.g. using the information in arbitrating network access between nodes or assigning dynamic time division multiple access (TDMA) windows). An acknowledgement message is a separate message sent from a node which acknowledges that a message was received and that the node is able to correctly process the message (i.e. the node is a non-faulty node) (though it is to be understood that, in some other embodiments, status information is communicated in other ways (that is, without the use of separate acknowledgement messages). Notably, although embodiments of the present invention are discussed below with regards to a TDMA configuration, other network configurations can be used in other embodiments.

Typically, each node is assigned a single time division multiple access (TDMA) slot or window. Node transmissions, including transmission of acknowledgement messages, are therefore serialized with the TDMA scheme. Hence, in traditional star networks, nodes do not receive all the acknowledgement messages of other nodes until the end of the transmission round. Embodiments of the present invention, however, enable more efficient communication of all the acknowledgement messages. In particular, embodiments of the present invention enable reception of all the acknowledgement messages as quick as within the next TDMA window for TDMA networks.

FIG. 1 is a schematic depiction of a star network according to one embodiment of the present invention. In star network 100, nodes 102-1 . . . 102-N (e.g. nodes A-D) are directly connected to a hub 104 via communication links 106. Communication links 106 can be bi-directional full duplex or bi-directional half-duplex links and are described here as being connected to a respective port of the hub 104. In this embodiment, hub 104 is a self-checking pair in order to detect and prevent failure of hub 104. A self-checking pair provides protection against a faulty hub since each member of the self-checking pair is able to provide guardianship over the other. However, it is to be understood that other configurations can be used in hub 104 in other embodiments. For example, in another embodiment, hub 104 is a dual self-checking pair. A dual self-checking pair provides additional guardianship protection. Alternatively, a triplex configuration with three members in hub 104 can be used. With a triplex configuration, each of nodes 102-1 . . . 102-N determines if a member of hub 104 is faulty by comparing data received from each of the three members. In other embodiments, other hub configurations can be used which also ensure that hub 104 fails passive.

Nodes 102-1 . . . 102-N are configured to receive and transmit messages. In particular, each of nodes 102-1 . . . 102-N are configured to communicate status information to the hub. In this example, each of nodes 102-1 . . . 102-N communicates status information independent of its assigned TDMA windows for transmission of messages originating from the respective node. In other words, each node does not have to wait for an assigned TDMA window to communicate its status information to the hub. In addition, in some embodiments, each of nodes 102-1 . . . 102-N communicates status information substantially simultaneously with other nodes. Also, in some embodiments, each of nodes 102-1 . . . 102-N communicates status information by transmitting an acknowledgement message immediately following receipt (for example, in an inter-frame gap following a received message in the case of a TDMA embodiment). In other embodiments, each of nodes 102-1 . . . 102-N receives a set number of messages forwarded from the hub and then transmits an acknowledgement message which acknowledges receipt of all of the messages in the set of messages.

Hub 104 is configured to relay or forward messages from each of nodes 102-1 . . . 102-N to the other nodes. In addition, hub 104 is configured to receive status information from each of nodes 102-1 . . . 102-N and compile the received status information into a status vector. For example, when hub 104 receives acknowledgment messages from nodes 102-1 . . . 102-N, hub 104 compiles an acknowledgment vector. Compiling the acknowledgement vector comprises combining each acknowledgement message into one message in some embodiments. In other embodiments, hub 104 analyzes each acknowledgement message to determine which nodes are faulty and compiles the results of the analysis into the acknowledgement vector. Hub 104 then inserts the acknowledgement vector, in some embodiments, into a second message being forwarded by hub 104 to nodes 102-1 . . . 102-N, such as by using register insertion. Alternatively, hub 104 originates a message containing the acknowledgement vector and sends the message to each of nodes 102-1 . . . 102-N. Moreover, the sending of an acknowledgement from each of the nodes 102-1 . . . 102-N to the hub 104 may also be dependent or conditioned on factors other than just the receipt of a particular message at a node. For example, each of the nodes 102-1 . . . 102-N may also check its operational status (for example, using an application heart beat) before sending an acknowledgement and, when the receiving node is not fully operational, either indicate that fact in the acknowledgement or not send an acknowledgement to the hub. In such an example, the status vector can also include such additional information.

In operation, one of nodes 102-1 . . . 102-N (e.g. node 102-1) sends a message via hub 104 to the other nodes in an assigned TDMA communication window. Hub 104 receives the message and forwards it to the remaining nodes (e.g. nodes 102-2 . . . 102-N). The nodes which successfully receive the message communicate status information, which acknowledges receipt of the message. For example, in some embodiments, the nodes communicate status information substantially simultaneously. In particular, nodes 102-1 . . . 102-N are configured to send an acknowledgement message in the interframe gap (IFG) immediately following the received message, in some embodiments. Alternatively, nodes 102-1 . . . 102-N can be adapted to wait and transmit the acknowledgement message after receiving a set number of messages.

Hub 104 receives the acknowledgement messages and compiles them into an acknowledgement vector, as described above. Hub 104, in some embodiments, inserts the acknowledgement vector into another message forwarded by hub 104. Alternatively, hub 104 originates a message sent to nodes 102-1 . . . 102-N which contains the acknowledgement vector. In this way, each of nodes 102-1 . . . 102-N is aware of the status (e.g. faulty or non-faulty) of the other network nodes upon receiving the acknowledgement vector. In some embodiments, nodes 102-1 . . . 102-N respond with an acknowledgement message in the inter-frame gap immediately after a received message. In some such embodiments, hub 104 compiles the acknowledgement vector and inserts the acknowledgement vector into a message being forwarded in the next communication window. Hence, in such embodiments, each of nodes 102-1 . . . 102-N receives the acknowledgement vector with the status of each node by the end of the next communication window rather than the next transmission round. Therefore, non-faulty nodes are able to agree on the operational status of nodes 102-1 . . . 102-N quicker than in typical TDMA networks.

Additionally, error detection coding can be included with the acknowledgement vector and/or individual acknowledgements messages. For example, in some embodiments, the acknowledgement vector includes a cyclic redundancy check (CRC) checksum which is used by each of nodes 102-1 . . . 102-N to detect errors in the acknowledgement vector. Also, in some embodiments, other nodes 102-1 . . . 102-N can be adapted to send other status messages in lieu of or in addition to acknowledgement messages.

For example, each of nodes 102-1 . . . 102-N can be adapted to send a reservation message. The reservation message indicates that a node is requesting to transmit a message in the next available communication window. In such embodiments, hub 104 compiles a reservation vector based on reservation messages received from one or more of nodes 102-1 . . . 102-N. In some embodiments, hub 104 determines which of nodes 202-1 . . . 202-N is to transmit in the next available window based on an analysis of the data in the received reservation messages and system policies. System policies can include, but are not limited to, bandwidth allocations, and each node's sending frequency, etc. Hub 104 then compiles the results of the analysis into a reservation vector. In other embodiments, hub 104 simply combines the received reservation messages into a reservation vector. In such embodiments, each of nodes 102-1 . . . 102-N determines which node is to transmit in the next available window based on an analysis of the data in the reservation vector and system policies.

Figure 2:
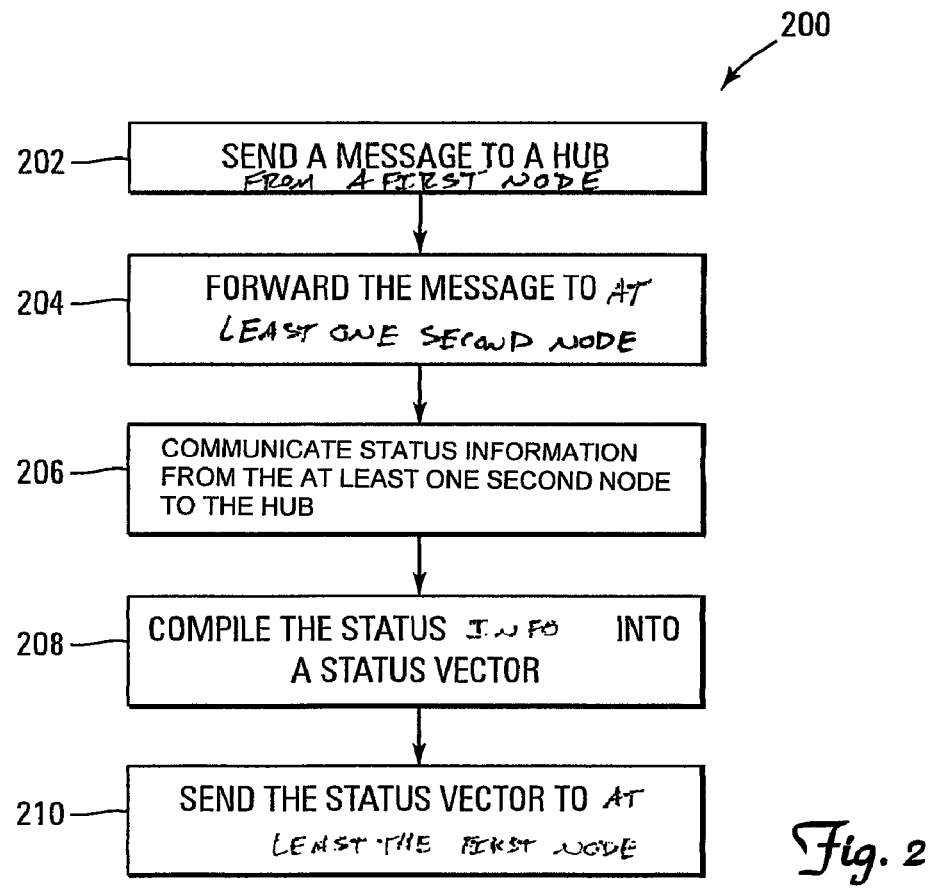
FIG. 2 is a flow chart depicting a method of communicating node status in a star network according to one embodiment of the present invention.

FIG. 2 is a flow chart depicting a method 200 of communicating node status in a star network (e.g. star network 100). At 202, a first node of a plurality of nodes (e.g. one of nodes 102-1 . . . 102-N) sends a first message to a hub (e.g. hub 104). At 204, the hub forwards the message to at least one second node of the plurality of nodes in the star network. At 206, the at least one second node communicates status information to the hub after receiving at least a portion of the first message. The at least one second node communicates the status information independent of assigned TDMA windows for the at least one second node. For example, in TDMA networks, the at least one second node communicates the status information regardless of when its assigned TDMA windows occur. In various embodiments or usage scenarios, the at least one second node can include any of the plurality of nodes 102 in the network 100 (including, for example, nodes other than the first node and/or the first node).

In some embodiments, each of the at least one second nodes communicates status information substantially simultaneously. In addition, in some embodiments, the at least one second node sends the status information in the inter-frame gap immediately following the first message. In other embodiments, the at least one node waits until having received a set number of messages and then sends status information regarding all of the received messages.

Furthermore, in some embodiments, the status information is an acknowledgement message indicating that the received message was received and processed correctly. Alternatively, the status information is a reservation message indicating that a node is ready to transmit a message origination at the node. In yet other embodiments, the status information contains both a reservation message and an acknowledgement message.

At 208, the hub compiles the status information into a status vector. The status vector can be an acknowledgement vector, reservation vector, or both. In some embodiments, compiling the status vector includes analyzing the status messages at the hub to determine the status of the nodes. In such embodiments, the status vector includes the results of the analysis. In other embodiments, compiling the status vector comprises combining the individual status messages into one status vector. In such embodiments, each node analyzes the status vector to determine the status of the other nodes. In particular, in some embodiments involving a reservation vector, compiling the reservation vector includes determining at the hub which node is to transmit in the next available communication window based on the reservation messages and including the determination in the reservation vector. The determination is based on the data in the reservation messages and system policies. System policies can include, but are not limited to, bandwidth allocations, and each node's sending frequency, etc. In other embodiments, compiling the reservation vector includes combining the reservation messages into the reservation vector. In such embodiments, each of the plurality of nodes determines which node is to transmit in the next available communication window individually based on the data in the reservation vector and system policies.

At 210, the hub sends the status vector to at least the first node which originated the first message. In some embodiments, the hub sends the status vector to each of the nodes. In addition, the hub inserts the status vector into a second message being forwarded by the hub, in some embodiments. Alternatively, the hub can originate a second message containing the status vector and send it to the plurality of nodes.

In the particular embodiments described above in connection with FIGS. 1 and 2, each node acknowledges the successful receipt of a broadcast message by communicating an acknowledgement message to the hub. The hub assembles a vector that indicates which nodes successfully received the original message from the acknowledgement message it receives for the particular broadcast message. The hub then forwards the vector to at least the node which originated the broadcast message. In other embodiments, such acknowledgements and vectors are communicated among the nodes and the hub in other ways that do not make use of separate acknowledgement messages. As noted above, such acknowledgements and vectors may be sent based on and/or include information relating to factors other than the successful receipt of a message (for example, relating to the operational status of a receiving node). Moreover, although the embodiments described above in connection with FIGS. 1 and 2 is described with respect to a broadcast message, in other embodiments other types of messages are used (e.g., multicast or unicast messages).

For example, in one alternative embodiment, the nodes and the network are arranged in a star topology of the type shown in FIG. 1, but a priority-based bus arbitration scheme (such as the scheme used in a Controller-Area Network (CAN)) is used to communicate on each point-to-point link between the hub and each node (or set of nodes). The set of nodes at a port are connected in a bus topology as usual for CAN. In such an embodiment, each receiving node (or set of nodes at a hub port) acknowledge(s), to the hub, the successful receipt of the data portion (and any associated cyclic redundancy check (CRC) field or other error checking/correcting fields) of a given frame by transmitting to the hub one or more high-priority or dominant bits within an acknowledgement field included within that same frame. For the non-successful receipt, nodes (or set of nodes at a hub port) do not acknowledge the correct reception by sending a recessive bit. In other implementations of such an embodiment, the receiving nodes communicate to the hub whether or not they successfully received message in other ways (for example, during a separate frame in which each receiving node communicates whether or not it successfully received the message using an appropriate encoding scheme that may or may not be different from the way in which "normal" CAN acknowledgements are encoded). The hub, in turn, assembles a vector that indicates which nodes have acknowledged receipt of the transmitted message. The hub then forwards the assembled vector to all the nodes in the network by assigning an appropriate priority to the acknowledgement vector frame so that the hub will win the bus arbitration on each point-to-point link at the desired time (for example, in the frame immediately following the transmitted frame or in some other following frame where the acknowledgement vector frame includes information (e.g., in a priority field or other part of the frame) that associates that acknowledgement vector frame with the corresponding transmitted frame). It is understood that if a set of nodes is attached to the hub on a single port, the acknowledgement signaling of the set of nodes will send acknowledge if at least one node correctly received the message. This is due to properties of CAN. Using set of nodes is only to be used if the acknowledgement vector can contain a single cumulative bit (acknowledge/not acknowledged) for the set of nodes on a port. One example of such an embodiment is described in the United States Provisional Patent Application filed on even data herewith, Ser. No. 60/864,926, title "PIPELINED ELEVATED PRIORITY CENTRALIZED ENFORCEMENT (PEPCE) FOR A CONTROLLER AREA NETWORK", which is hereby incorporated by reference in its entirety.

Although specific embodiments have been illustrated and described herein, it will be appreciated by those of ordinary skill in the art that any arrangement, which is calculated to achieve the same purpose, may be substituted for the specific embodiment shown. For example, although embodiments of the present invention are discussed above with relation to a TDMA configuration, it is to be understood that other configurations can be used in other embodiments of the present invention. Such other configurations include, but are not limited to, the following.

FIG. 1 illustrates an embodiment in which each port of the hub is coupled to a single node. In other embodiments, one or more ports of the hub may be communicatively coupled to multiple nodes (for example, multiple nodes that communicate with one another and the respective port of the hub using a bus) and treat the multiple nodes either as a single logical entity or individually for the acknowledgement processing described here.

In the above mentioned mechanisms of acknowledgement, it is to be understood that non-functional properties, such as dependability, can be ensured by industry-typical approaches, such as coverage schemes like command and monitor approaches, can be used to ensure that the acknowledgement information is conveyed with sufficient guarantees and the system behavior is not impacted due to faulty behavior of devices implementing the above-mentioned mechanisms.

The function creating the acknowledgement vector at the hub may simply insert acknowledgement information included in an acknowledgement message (or other type of acknowledgement) that is received at the hub from each node. In case the hub does not receive any acknowledgement information (within a specific timeout period or when it is otherwise expected to be received) from a particular node, the hub may take some default action for that node. For example, the hub may assume that the status of such a node is "not acknowledged" and include such status of the appropriate status vector.

The present invention is understood to be able to include multiple nodes being connected to one port; each of the nodes will likely use a bus to connect to the hub.

What is claimed is:

1. A method of communicating node status in a star network comprising a hub and a plurality of nodes, the method comprising:
   sending a first message to the hub from a first node included in the plurality of nodes;
   forwarding the first message from the hub to at least one second node included in the plurality of nodes;
   communicating status information to the hub from the at least one second node after receiving at least a portion of the first message at the at least one second node;
   compiling a status vector at the hub based on the status information received from each of the at least one second nodes; and
   sending the status vector from the hub to at least the first node;
   wherein compiling the status vector at the hub comprises one of:
   combining the status information received from each of the at least one second nodes into the status vector; or
   analyzing the status information received from each of the at least one second nodes and combining results of the analysis into the status vector; and
   wherein sending the status vector from the hub to at least the first node includes one of:
   inserting the status vector into a second message being forwarded by the hub; or
   originating in the hub a second message containing the status vector.

2. The method of claim 1, wherein communicating status information comprises communicating status information from the at least one second node independent of the at least one second node's assigned time division multiple access (TDMA) windows.

3. The method of claim 1, wherein communicating status information comprises sending status information in an inter-frame gap immediately following the first message.

4. The method of claim 1, wherein communicating status information comprises communicating status information from each of the at least one second nodes substantially simultaneously.

5. The method of claim 1, wherein communicating status information comprises communicating at least one of an acknowledgement message and a reservation message.

6. The method of claim 1, wherein communicating status information comprises communicating status information from the at least one second node after receiving at the at least one second node a set number of messages forwarded from the hub.

7. The method of claim 1, wherein communicating status information comprises acknowledging successful receipt of a predetermined portion of a given frame by transmitting to the hub one or more high-priority or dominant bits within an acknowledgement slot included within said given frame.

8. The method of claim 1, wherein sending the status vector from the hub comprises sending the status vector from the hub to each of the plurality of nodes.

9. A communication network, comprising:
   a plurality of communication links;
   a hub; and
   a plurality of nodes, each node coupled to the hub via one or more of the plurality of communication links;
   wherein each of the plurality of nodes are configured to communicate status information to the hub after receiving at least a portion of a first message forwarded from the hub to the plurality of nodes, and
   wherein the hub is configured to compile the status information into a status vector and send the status vector to at least the node which originated the first message;
   wherein the hub is configured to compile the status vector by combining the status information received from each of the at least one second nodes into the status vector; or by analyzing the status information received from each of the at least one second nodes and combining results of the analysis into the status vector; and
   wherein the hub is configured to send the status vector from the hub to at least the node which originated the first message by inserting the status vector into a second message being forwarded by the hub; or originating in the hub a second message containing the status vector.

10. The communication network of claim 9, wherein each node communicates status information independent of its assigned time division multiple access (TDMA) windows.

11. The communication network of claim 9, wherein the status information includes at least one of an acknowledgement message and a reservation message.

12. The communication network of claim 9, wherein the plurality of nodes are configured to send the status information in an inter-frame gap immediately following the first message.

13. The communication network of claim 9, wherein the plurality of nodes are configured to communicate the status information to the hub after receiving a plurality of messages.

14. The communication network of claim 9, wherein the hub is configured to insert the status vector into a second message being forwarded by the hub or to originate a second message containing the status vector.

15. The communication network of claim 9, wherein each node is configured to communicate status information, the status information acknowledging successful receipt of a predetermined portion of a given frame, by transmitting to the hub one or more high-priority or dominant bits within an acknowledgement slot included within said given frame.

16. The communication network of claim 15, wherein the predetermined portion of the given frame comprises at least one of a data payload portion and any associated cyclic redundancy check (CRC) field or other error checking/correcting fields of the given frame.

17. The communication network of claim 9, wherein the hub is configured to send the status vector to each of the plurality of nodes.

18. A program product comprising program instructions embodied on a non-transitory processor-readable storage medium for execution by a programmable processor included in a hub that is used in a network comprising a plurality of nodes that are communicatively coupled to the hub, wherein the program instructions are operable to cause the programmable processor to:

receive a first message from a first node of the plurality of nodes;

forward the first message to at least one second node of the plurality of nodes;

receive status information from the at least one second node;

compile a status vector based on the status information received from the at least one second node; and send the status vector to at least the first node;

wherein the program instructions are operable to cause the programmable processor to compile the status vector by combining the status information received from each of the at least one second nodes into the status vector; or by analyzing the status information received from each of the at least one second nodes and combining results of the analysis into the status vector; and wherein the program instructions are further operable to cause the programmable processor to insert the status vector into a second message being forwarded by the hub or to originate a second message containing the status vector.

* * * * *